United States Patent
Li

(10) Patent No.: US 10,861,134 B2
(45) Date of Patent: Dec. 8, 2020

(54) IMAGE PROCESSING METHOD AND DEVICE

(71) Applicant: BOE TECHNOLOGY GROUP CO., LTD., Beijing (CN)

(72) Inventor: Yingying Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 141 days.

(21) Appl. No.: 16/009,151

(22) Filed: Jun. 14, 2018

(65) Prior Publication Data
US 2019/0057488 A1 Feb. 21, 2019

(30) Foreign Application Priority Data
Aug. 17, 2017 (CN) .......................... 2017 1 0707821

(51) Int. Cl.
*G06T 3/40* (2006.01)
*G06T 7/136* (2017.01)
*G06K 9/32* (2006.01)
*G06T 7/11* (2017.01)
(Continued)

(52) U.S. Cl.
CPC .......... *G06T 3/4053* (2013.01); *G06K 9/3233* (2013.01); *G06K 9/38* (2013.01); *G06K 9/4628* (2013.01); *G06T 7/11* (2017.01); *G06T 7/136* (2017.01); *G06K 2209/05* (2013.01); *G06T 2207/10068* (2013.01); *G06T 2207/10081* (2013.01); *G06T 2207/10088* (2013.01);
(Continued)

(58) Field of Classification Search
CPC ......... G06T 3/4053; G06T 7/136; G06T 7/11; G06T 2207/30004; G06T 2207/10088; G06T 2207/20081; G06T 2207/20084; G06T 2207/10068; G06T 2207/10081; G06K 9/4628; G06K 9/3233; G06K 9/38; G06K 2209/05
See application file for complete search history.

(56) References Cited

U.S. PATENT DOCUMENTS 7,146,031 B1 * 12/2006 Hartman ............... G06T 7/0012
382/132
2013/0051519 A1 * 2/2013 Yang ..................... G06T 11/005
378/19
(Continued)

FOREIGN PATENT DOCUMENTS

CN 106910161 * 1/2017
KR 20170038622 * 4/2017

OTHER PUBLICATIONS

Machine translation for KR20170038622 (Year: 2017).*
Machine translation for CN 106910161 (Year: 2017).*

*Primary Examiner* — Qian Yang
(74) *Attorney, Agent, or Firm* — Kinney & Lange, P.A.

(57) ABSTRACT

An image processing device and an image processing method are disclosed. The image processing method comprises: acquiring an image; segmenting the acquired image by using a deep learning-based segmentation process to obtain a binarized image labeled with a region of interest; processing a pixel matrix of the acquired image by using a pixel matrix of the binarized image to obtain a segmented image; and performing super-resolution reconstruction on the segmented image by using a deep learning-based super-resolution neural network to obtain a reconstructed image.

13 Claims, 3 Drawing Sheets

(51) Int. Cl.
 G06K 9/38 (2006.01)
 G06K 9/46 (2006.01)
(52) U.S. Cl.
 CPC ............... *G06T 2207/20081* (2013.01); *G06T 2207/20084* (2013.01); *G06T 2207/30004* (2013.01)

(56) References Cited

U.S. PATENT DOCUMENTS

2017/0024629 A1* 1/2017 Thrasher ................. G06T 7/187
2018/0373953 A1* 12/2018 Tomotaki ............. G06K 9/4628

* cited by examiner

IMAGE PROCESSING METHOD AND DEVICE

CROSS-REFERENCE TO RELATED APPLICATION(S)

This application claims priority to the Chinese Patent Application No. 201710707821.2, filed on Aug. 17, 2017, entitled "IMAGE PROCESSING METHOD AND DEVICE," which is incorporated herein by reference in its entirety.

TECHNICAL FIELD

The embodiments of the present disclosure relate to a field of image processing, and more particularly, to an image processing method and device.

BACKGROUND

Medical imaging technology allows doctors to fully understand a patient's internal pathological structure, and thus develop precise treatment plans. In a process of forming medical images, the medical images are inevitably degraded due to the influences caused by an imaging environment, an imaging system etc. Processing of low-quality medical images is an urgent problem to be solved in the field of image processing.

SUMMARY

In an aspect of the embodiments of the present disclosure, there is provided an image processing method, comprising: acquiring an original image; segmenting the original acquired image by using a deep learning-based segmentation process to obtain a binarized image labeled with a region of interest; processing the original image by using the binarized image to obtain a segmented image; performing super-resolution reconstruction on the segmented image by using a deep learning-based super-resolution neural network to obtain a reconstructed image; and outputting and displaying the reconstructed image.

In an example, processing the original image by using the binarized image comprises: calculating a dot product of a pixel matrix of the binarized image and a pixel matrix of the original image to obtain the segmented image.

In an example, the method further comprises: performing a normalization process on the original image before segmenting the original image.

In an example, the normalization process comprises at least one of color normalization and illumination normalization.

In an example, the method further comprises: extracting and displaying the region of interest in the reconstructed image.

In an example, the method further comprises: constructing an image recognition model using the reconstructed image.

In an example, the method further comprises: inputting the reconstructed image into an image recognition model to recognize at least one of a category and a name of the region of interest in the reconstructed image.

In another aspect of the embodiments of the present disclosure, there is provided an image processing device, comprising: an input unit configured to acquire an original image; a memory configured to store instructions; and a processor configured to execute the instructions stored in the memory to: segment the original image acquired by using a deep learning-based segmentation process to obtain a binarized image labeled with a region of interest; process the original image by using the binarized image to obtain a segmented image; perform super-resolution reconstruction on the segmented image by using a deep learning-based super-resolution neural network to obtain a reconstructed image; and output the reconstructed image for display.

In an example, the processor is further configured to: calculate a dot product of a pixel matrix of the binarized image and a pixel matrix of the original image to obtain the segmented image.

In an example, the processor is further configured to perform a normalization process on the original image acquired.

In an example, the normalization process comprises at least one of color normalization and illumination normalization.

In an example, the processor is further configured to extract the region of interest in the reconstructed image.

In an example, the image processing device further comprises: a display configured to display at least one of the reconstructed image and the region of interest in the reconstructed image.

DETAILED DESCRIPTION

Various solutions and features of the present disclosure are described here with reference to the accompanying drawings.

It should be understood that various modifications can be made to the embodiments disclosed here. Therefore, the above specification should not be taken as limiting but merely as an example of the embodiments. Those skilled in the art will envision other modifications within the scope and spirit of the present disclosure.

The accompanying drawings, which are incorporated in and constitute a part of the specification, illustrate embodiments of the present disclosure and are intended to explain the principle of the present disclosure together with the general description of the present disclosure given above and the detailed description of the embodiments given below.

These and other features of the present disclosure will become apparent from the following description of embodiments given as non-limiting examples with reference to the accompanying drawings.

It should also be understood that although the present disclosure has been described with reference to certain specific examples, those skilled in the art can ascertainably implement many other equivalent forms of the present disclosure which have the features recited in the claims and therefore fall within the protection scope defined by the claims.

The above and other aspects, features and advantages of the present disclosure will become more apparent from the following detailed description when taken in conjunction with the accompanying drawings.

Hereinafter, specific embodiments of the present disclosure will be described with reference to the accompanying drawings; however, it is to be understood that the disclosed embodiments are merely examples of the present disclosure, which can be implemented in various ways. Well-known and/or repetitive functions and structures have not been described in detail to avoid unnecessary or superfluous details that would obscure the present disclosure. Thus, specific structural and functional details disclosed herein are not intended to be limiting, but merely as a basis for the claims and as a representative basis for teaching those skilled in the art to variously employ the present disclosure in substantially any appropriately detailed structure.

This specification may use phrases such as "in one embodiment," "in another embodiment," "in yet another embodiment," or "in other embodiments," all referring to the same language "according to the same embodiment of the present disclosure or one or more of different embodiments of the present disclosure."

An image referred to herein may comprise: a Computed Tomography (CT) image, an endoscopic image, a Magnetic Resonance Imaging (MRI) image, etc. It can be understood by those skilled in the art that the "image" to which the image processing method according to the embodiment of the present disclosure can be applied is not limited thereto.

Figure 1:
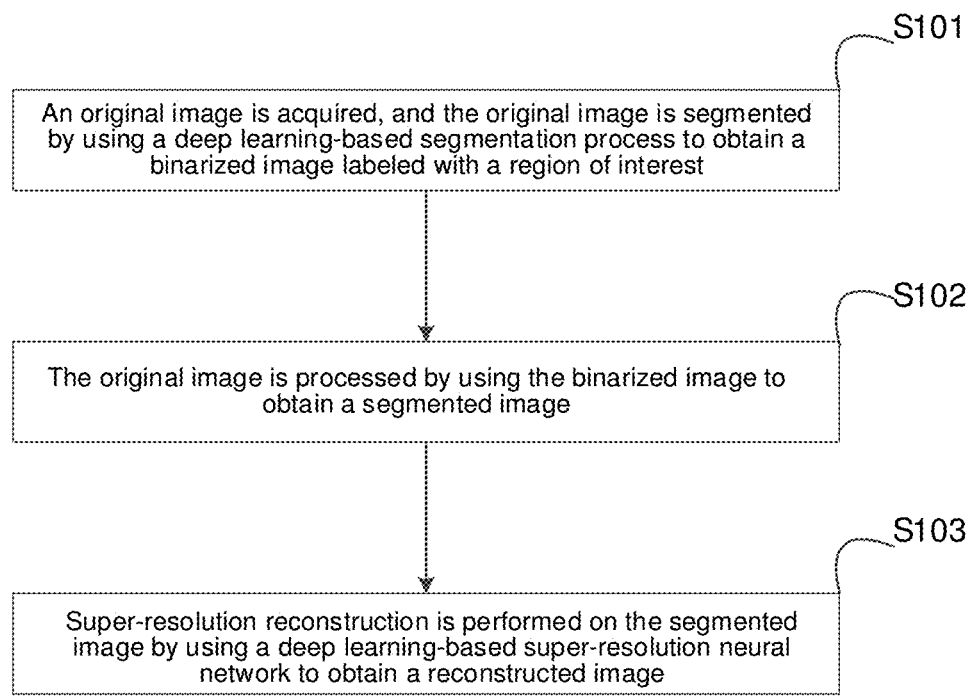
FIG. 1 is a flowchart of an image processing method according to an embodiment of the present disclosure.

As shown in FIG. 1, illustrated is an image processing method according to an embodiment of the present disclosure. The method may comprise the following steps.

In step S101, an original image is acquired, and the original image acquired is segmented by using a deep learning-based segmentation process to obtain a binarized image labeled with a region of interest.

Image segmentation is a technique and process of segmenting an image into a number of specific regions with unique properties and extracting objects of interest therefrom. It is a step between image processing and image analysis. Medical image segmentation is an area of image segmentation and is used to automatically obtain a region of interest from an image by segmenting the image. For a medical image, for example, only a specific region of the image is often of interest, and therefore image segmentation has a very special meaning in the medical image. For example, if a fracture is observed, it only needs to separate a feature image (usually a region having a certain grayscale value) represented by bones from the background (such as muscles having another grayscale value), and the muscles are not displayed (or displayed in black.) As organs and tissues of a human body may be deformed, and there is a small difference between adjacent grayscales in an image, these factors increase the difficulty in image segmentation. Therefore, if a region of interest needs to be accurately obtained by segmentation, it needs to have higher requirements for feature extraction. As deep learning has multiple hidden layers, it has characteristics such as an ability to automatically learn useful features and is very effective in feature extraction and practical applications of final segmentation results. Therefore, in this step, a deep learning-based segmentation process is used to segment a medical image so as to guarantee the segmentation quality.

In step S101, a deep learning-based image segmentation technique (for example, a Convolutional Neural Network (CNN)-based segmentation algorithm, a Fully Convolutional Network (FCN)-based segmentation algorithm etc.) may be used. Deep learning is a model having many hidden layers, wherein an output of an underlying layer is used as an input of a higher layer. Deep learning is an unsupervised learning process from bottom to top, and can automatically learn useful features and represent low-level features as high-level features. Deep learning is a supervised learning process from top to bottom, and optimizes and adjusts parameters of the entire network through tagged data so that the entire network has better feature learning capabilities. Such a learning and representation structure of the features is very robust to deformation and translation of an image. This solves the problem that features of a medical image are not easy to learn, and can segment the image into different regions, tag regions of interest, and finally complete the segmentation of the image in combination with a classification algorithm.

For example, the CNN-based segmentation method may comprise performing training and prediction using one image block around one pixel as an input of the CNN in order to classify the pixel. This method has the following disadvantages. Firstly, a large storage overhead is used, for example, 15*15 image blocks are used for each pixel. Secondly, a window is continuously slid, the image blocks are input into the CNN for category judgment, and as a result, a required storage space sharply rises with a number of times the window is slid and a size of the window. Thirdly, this method is inefficient, since adjacent pixel blocks are substantially repetitive, convolution is calculated pixel block by pixel block, and therefore this calculation has a large degree of repetition. Finally, a size of a sensing region is limited by a size of the pixel blocks, since the size of the pixel blocks is usually much less than that of the entire image, and only some local features can be extracted, which results in a limited classification performance. Therefore, the FCN-based algorithm is used in the embodiments of the present disclosure. This fully convolutional network attempts to recover, from abstract features, a category to which each pixel belongs, i.e., extending from image level classification to pixel level classification. The main principle of the FCN is to replace the operation of sliding a window in the CNN with a convolutional operation, and to replace a fully connected layer which is connected after a ReLU layer in the CNN with a convolutional layer. Therefore, there are no requirements for a size of an input image. For example, the FCN has a corresponding judgment label on an output for each pixel of the input image, which indicates what object/category this pixel is most likely to belong to, that is, a category to which each pixel belongs. Thereby, an end-to-end approach for image segmentation is obtained, which automatically obtains a region of interest from an image by segmenting the image while ignoring the interference from unnecessary regions.

The main idea of the FCN is to supplement the contracted network through successive layers, wherein a pooling operation is replaced with an up-sampling operation. Therefore, these layers increase the output resolution. For positioning, high resolution features from a contracted path are combined with an up-sampled output. Successive convolutional layers can be learned to be output more precisely based on this information set. U-Net architecture comprises a contracted path and an expanded path. The contracted path follows typical architecture of a convolutional network. It involves repeated application of two 3×3 convolutions, followed by a Rectified Linear Unit (ReLU) and a 2×2 maximum pooling operation for down-sampling. A number of feature channels is doubled in each down-sampling step. Each step in the expanded path comprises up-sampling of a feature map, followed by a 2×2 convolution which halves the number of feature channels, two 3×3 convolutions, and a ReLU. The network has a total of 23 convolutional layers.

Figure 2:
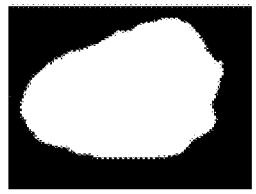
FIG. 2 exemplarily illustrates an exemplary binarized image obtained after an image is processed by using a deep learning-based image segmentation process.

FIG. 2 exemplarily illustrates an exemplary binarized image obtained after an image is processed by using a deep learning-based image segmentation process. In this figure, a black portion is a region of no interest, of which a value may be set to 0, and pixel points in a white portion has a value of 1, that is, all pixels are binarized into 0 or 1.

Figure 3:
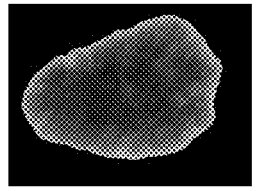
FIG. 3 is an exemplary unreconstructed image to be reconstructed by using a super-resolution reconstruction process.

Next, in step S102, an original image acquired is processed by using the binarized image to obtain a segmented image. For example, a pixel matrix of the segmented image may be obtained by calculating a dot product of a pixel matrix of the binarized image and a pixel matrix of the original image. In the pixel matrix of the segmented image, a value at a pixel position corresponding to the region of interest is a pixel value of the original image, and a value at a pixel position corresponding to the region of no interest is 0, which can reduce a data amount of the segmented image. For example, the resulting segmented image is shown in FIG. 3. As a result, in a subsequent super-resolution reconstruction step S103, it is not necessary to perform processing on the region of no interest of the original image, which reduces the computational load.

In step S103, super-resolution reconstruction is performed on the segmented image by using a deep learning-based super-resolution neural network to obtain a reconstructed image.

Spatial resolution is a reflection of image quality. Due to characteristics such as a high pixel density and a high image quality of a high spatial resolution image, the high spatial resolution image may provide more detailed information about an imaging scene. The Super-Resolution (SR) technology of images is a process of generating a high spatial resolution image of an image scene based on one or more low-resolution images of the scene. For classification of super-resolution problems, relevant super-resolution reconstruction algorithms may be divided into three major categories, i.e., an interpolation-based method, a reconstruction-based method, and a learning-based method. The deep learning-based method is based on an image super-resolution convolutional neural network. The network may directly learn end-to-end mapping between a low resolution image and a high resolution image, and there is almost no pre/post-processing before optimization. In the field of medical image processing, the deep learning techniques are applied to medical images, wherein a low resolution image is used as an input, and a high resolution image is output, which can overcome the effects due to a poor image resolution and obtain images with a higher quality. In addition, this facilitates further improvements of algorithm models.

Therefore, according to an embodiment of the present disclosure, super-resolution reconstruction is performed on the segmented image by using a deep learning-based super-resolution neural network.

By taking a Super-Resolution Convolutional Neural Network (SRCNN) as an example, a method according to an embodiment of the present disclosure may comprise: performing feature extraction; mapping a low resolution space to a high resolution space through a non-linear mapping layer; and gathering to obtain a high resolution image, thereby realizing end-to-end mapping from a low resolution image to a high resolution image directly in a learning manner, and reducing the optimization load before and after the algorithm. For example, the super-resolution reconstruction method according to an embodiment of the present disclosure may comprise the following steps.

Firstly, the segmented image is preprocessed. For example, for a single low-resolution segmented image, the segmented image is upgraded to a desired size by using a bicubic interpolation process to obtain an interpolated image. The interpolated image is expressed as Y.

Then, an object is learned by minimizing a loss function. For example, by learning one map F, the interpolated image Y is restored to an image F(Y) which resembles a high resolution image X as much as possible. This process may comprise the following steps.

Extraction and representation of small blocks. Small blocks are extracted from the image Y, and each of the small blocks is represented as a high-dimensional vector, wherein the small blocks may partially overlap each other.

Non-linear mapping. Each high-dimensional vector is non-linearly mapped to another high-dimensional vector, and the resulting other high-dimensional vector is represented as a high resolution small block.

Reconstruction. The high-resolution small blocks are gathered to produce a final high-resolution image.

According to an embodiment of the present disclosure, given a group of high-resolution images {Xi} and corresponding low-resolution images {Yi} thereof, a Mean Square Error (MSE) may be used as a loss function:

$$L(\theta) = \frac{1}{n} \sum_{i=1}^{n} \|F(Y_i; \theta) - X_i\|^2,$$

where n is a number of training samples.

The super resolution-reconstructed image is obtained by using the deep learning-based super-resolution neural network described above in step S103.

In addition, the above-described SRGAN algorithm may also be used to perform super-resolution reconstruction on the unreconstructed image. For example, an adversarial network may be applied to image segmentation, and overfitting is reduced due to the use of adversarial training.

Figure 4:
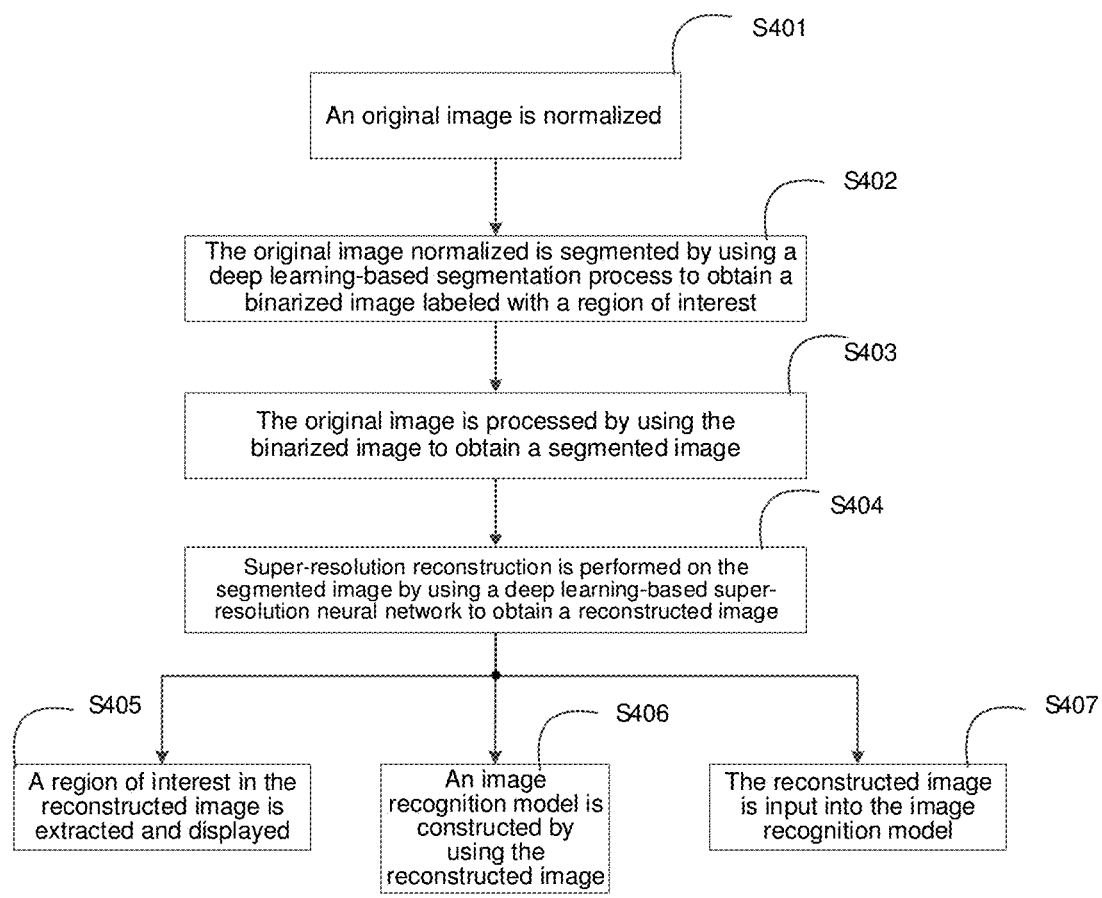
FIG. 4 is a flowchart of an image processing method according to an embodiment of the present disclosure.

As shown in FIG. 4, there is provided an image processing method according to an embodiment of the present disclosure. The method may comprise the following steps.

In S401, an original image is acquired and the original image is normalized.

Due to the differences in image acquisition device, acquisition technique, and imaging environment, there are great differences in size, luminance etc. Therefore, in this step, a normalization process, such as color normalization, luminance normalization etc. may be performed on the same category of medical images, thereby reducing the differences in original image due to external factors to some extent. Therefore, in the subsequent processing, the resulting high-resolution image can be better applied to a medical image recognition model.

Figure 5:
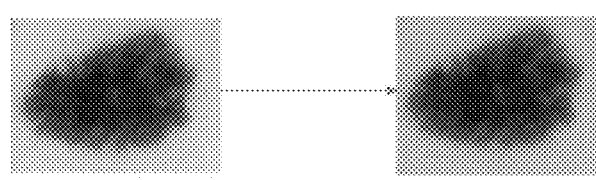
FIG. 5 illustrates a diagram of an exemplary normalization process for an image.

According to different categories of medical images, different normalization parameters need to be set. FIG. 5 illustrates a normalization process of an image. The left side is an un-normalized image, and the right side is a normalized image.

Next, in step S402, the original image is segmented by using a deep learning-based segmentation process to obtain a binarized image labeled with a region of interest.

Next, in step S403, the original image is processed by using the binarized image to obtain a segmented image.

Next, in step S404, super-resolution reconstruction is performed on the segmented image by using a deep learning-based super-resolution neural network to obtain a reconstructed image.

Specific implementations of steps S402-404 can be known with reference to specific implementations of steps S101-S103 in the previous embodiment. According to the embodiments of the present disclosure, color and brightness processing may be performed on an original image with a low quality, which reduces the differences in original image due to external factors. Thereby, it can not only help doctors perform better diagnosis but also facilitate further optimization of image recognition models.

Next, in step S405, a region of interest in the reconstructed image is extracted and displayed. As the super-resolution reconstruction process has been performed on the region of interest in the reconstructed image, the region of interest has a high resolution and may be directly provided to doctors for diagnosis. In addition, the super-resolution reconstruction process is not performed on the region of no interest, which reduces the computational load and shortens the processing time. Alternatively, the reconstructed image obtained in step S404 may also be directly provided to doctors for diagnosis, and thereby step S405 may be omitted.

Next, in step S406, an image recognition model is constructed by using the reconstructed image obtained in step S404. As different normalization processes are performed on different categories of images, it can be ensured that a robust image recognition model is constructed. Specific methods for constructing an image recognition model may comprise, but not limited to, Support Vector Machines (SVMs), Bayesian classifiers, color histograms, k-nearest neighbor classifiers, etc.

Then, in step S407, the reconstructed image obtained in step S404 is input into the image recognition model so that at least one of a category and a name of the region of interest can be recognized.

The image recognition model is a trained model, which may be various image recognition models, so that a reconstructed image input thereto can be automatically detected or classified and a detection or classification result can be output. In this way, a doctor may refer to a category or a name of the reconstructed image given by the image recognition model.

An order of the above steps is not fixed and is only given here as an example. For example, steps 405, 406, and 407 may be performed in parallel, or may be performed sequentially, or one or two of the steps 405, 406, and 407 may be performed.

Figure 6:
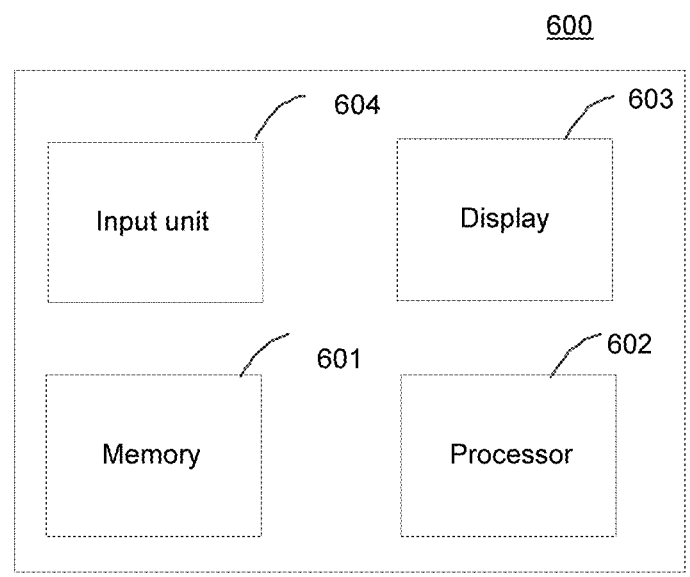
FIG. 6 illustrates an image processing device according to an embodiment of the present disclosure.

In the following embodiments, an image processing device according to an embodiment of the present disclosure will be described. As shown in FIG. 6, the image processing device 600 comprises a memory 601, a processor 602, and an input unit 604. The input unit 604 is configured to acquire an original image. The memory 601 stores calculation instructions and image data. The image data may comprise the acquired original image data, image data obtained in each step during the processing, and image data obtained after the processing is completed. The image data may be stored in the memory 601 or may be transmitted to the memory 601 through communication. The calculation instructions may be read and executed by the processor 602 to implement various steps of the image processing method according to the present disclosure. The memory 601 may be any type of suitable memory device, such as a Dynamic Random Access Memory (DRAM) device, a Synchronous Dynamic Random Access Memory (SDRAM) device, a Double Data Rate Dynamic Random Access Memory (DDR SDRAM) device, and/or other volatile memory devices.

The processor 602 is, for example, a programmable logic device or a general-purpose processor and is configured to perform the following processing on the original image by executing the calculation instructions:

segmenting the original image by using a deep learning-based segmentation process to obtain a binarized image labeled with a region of interest;

processing the original image by using the binarized image to obtain a segmented image; and performing super-resolution reconstruction on the segmented image by using a deep learning-based super-resolution neural network to obtain a reconstructed image.

In one embodiment, processing the original image by using the binarized image comprises: calculating a dot product of a pixel matrix of the binarized image and a pixel matrix of the original image to obtain the segmented image.

In one embodiment, the processor 602 is configured to perform a normalization process on the original image before segmenting the original image. The normalization process comprises at least one of color normalization and illumination normalization.

In addition, the processor 602 may further be configured to extract the region of interest in the reconstructed image.

The image processing device 600 may further comprise a display 603 configured to display the region of interest in the reconstructed image. In addition, the display 603 may also input the region of interest in the reconstructed image into the image recognition model to recognize a category or a name of the region of interest.

The image processing device 600 may be a separate device such as a computer device capable of being communicatively coupled with an imaging device such as CT, MRI, an ultrasound imaging device, etc. through the input unit 604 to read image data of the imaging device or acquire image data to be processed via an external storage device. The image processing device 600 may also be a module integrated on the imaging device.

Although only one region of interest is shown in the figures, the method and device according to the present disclosure may detect and obtain multiple regions of interest, display the multiple regions of interest on a display, and detect a category and/or a name of each region of interest.

In conclusion, the embodiments of the present disclosure propose a deep learning-based low resolution image processing method and a device capable of implementing the above method. In order to overcome the influences brought by the image acquisition device, the acquisition technique, and the imaging environment, the embodiments of the present disclosure perform segmentation and high-resolution reconstruction processing on the original image in combination with the deep learning technique to obtain a high resolution image. The obtained results can help doctors better interpret the images on the one hand, and can be used for training an automatic image recognition model on the other hand, thus improving the recognition accuracy.

The above embodiments are merely exemplary embodiments of the present disclosure and are not intended to limit the present disclosure, and the protection scope of the present application is defined by the claims. Those skilled in the art can make various modifications or equivalent substitutions to the present disclosure within the substance and scope of the present disclosure, and such modifications or equivalent substitutions should also be considered to fall within the protection scope of the present application.

I claim:

1. An image processing device, comprising:
an input unit configured to acquire an original image;
a memory configured to store instructions; and
a processor configured to execute the instructions stored in the memory to:
segment the original image acquired by using a deep learning-based segmentation process to obtain a binarized image labeled with a region of interest;
process the original image by using the binarized image to obtain a segmented image;
perform super-resolution reconstruction on the segmented image by using a deep learning-based super-resolution neural network to obtain a super-resolution reconstructed image; and
output the reconstructed image for display,
wherein the processor is further configured to execute the instructions stored in the memory to:
perform a bicubic interpolation process on the segmented image to obtain an interpolated image;
obtain the super-resolution reconstructed image from the interpolated image by minimizing a loss function;
extract small blocks from the interpolated image, each of the small blocks being represented as a respective first high-dimensional vector;
non-linearly map each first high-dimensional vector to a respective second high-dimensional vector being represented as a respective high-resolution small block; and
gather the high-resolution small blocks to produce the super-resolution reconstructed image, and
wherein the processor is further configured to execute the instructions stored in the memory to:
extract the region of interest in the reconstructed image; or
construct an image recognition model using the reconstructed image; or
input the reconstructed image into an image recognition model to recognize at least one of a category or a name of the region of interest in the reconstructed image.

2. The image processing device according to claim 1, wherein the processor is further configured to execute the instructions stored in the memory to: calculate a dot product of a pixel matrix of the binarized image and a pixel matrix of the original image to obtain the segmented image.

3. The image processing device according to claim 2, further comprising:
a display configured to display at least one of the reconstructed image and the region of interest in the reconstructed image.

4. The image processing device according to claim 1, wherein the processor is further configured to execute the instructions stored in the memory to perform a normalization process on the original image acquired.

5. The image processing device according to claim 4, wherein the normalization process comprises at least one of color normalization and illumination normalization.

6. The image processing device according to claim 5, further comprising:
a display configured to display at least one of the reconstructed image and the region of interest in the reconstructed image.

7. The image processing device according to claim 4, further comprising:
a display configured to display at least one of the reconstructed image and the region of interest in the reconstructed image.

8. The image processing device according to claim 1, further comprising:
a display configured to display at least one of the reconstructed image and the region of interest in the reconstructed image.

9. The image processing device according to claim 1, further comprising:
a display configured to display at least one of the reconstructed image and the region of interest in the reconstructed image.

10. An image processing method, comprising:
acquiring an original image;
segmenting the original acquired image by using a deep learning-based segmentation process to obtain a binarized image labeled with a region of interest;
processing the original image by using the binarized image to obtain a segmented image;
performing super-resolution reconstruction on the segmented image by using a deep learning-based super-resolution neural network to obtain a super-resolution reconstructed image; and
outputting and displaying the reconstructed image,
wherein performing super-resolution reconstruction on the segmented image by using a deep learning-based super-resolution neural network comprises:
perform a bicubic interpolation process on the segmented image to obtain an interpolated image;
obtaining the super-resolution reconstructed image from the interpolated image by minimizing a loss function;
extracting small blocks from the interpolated image, each of small blocks being represented as a high-dimensional vector;
non-linearly mapping each of high-dimensional vectors to each of another high-dimensional vectors being represented as high-resolution small blocks; and
gathering the high-resolution small blocks to produce the super-resolution reconstructed image, and
wherein the method further comprises:
extracting the region of interest in the reconstructed image; or
constructing an image recognition model using the reconstructed image; or
inputting the reconstructed image into an image recognition model to recognize at least one of a category and a name of the region of interest in the reconstructed image.

11. The image processing method according to claim 10, wherein processing the original image by using the binarized image comprises: calculating a dot product of a pixel matrix of the binarized image and a pixel matrix of the original image to obtain the segmented image.

12. The image processing method according to claim 10, further comprising:
performing a normalization process on the original image before segmenting the original image.

13. The image processing method according to claim 10, wherein:
the normalization process comprises at least one of color normalization and illumination normalization.

* * * * *